United States Patent Office
3,453,691
Patented July 8, 1969

3,453,691
TRANSFER MOULDING APPARATUS
Walter Robert Groves, Wolverhampton, England, assignor to British Industrial Plastics Limited, London, England, a corporation of the United Kingdom
Filed Nov. 9, 1966, Ser. No. 593,216
Claims priority, application Great Britain, Nov. 18, 1965, 49,043/65
Int. Cl. B29f 1/02
U.S. Cl. 18—30                                    2 Claims

ABSTRACT OF THE DISCLOSURE

A transfer moulding apparatus comprising two relatively separable mould parts, at least one of the mould parts having associated with it a transfer pot; a preplasticiser adapted, when the mould parts are separated, to move between the mould parts and charge the transfer pot with preplasticised moulding material and a plunger or equivalent means for transferring the moulding material from the transfer pot to the moulding cavity when the mould parts are brought together.

---

This invention relates to the moulding of plastics materials, and is especially concerned with a transfer moulding apparatus and method.

The moulding of both thermoplastic and thermosetting materials is well known. One way of moulding thermoplastic materials is by injection moulding, in which the thermoplastic raw material, generally in granular form, is fed from a hopper into a horizontally disposed plasticising cylinder. The material is pushed along inside the plasticising cylinder by a plunger, and at the same time is is heated to a temperature at which it is sufficiently plastic to be moulded. The plasticised material is then forced through an orifice into a mould arranged to open and close horizontally. Alternatively, instead of a plunger-operated device a screw plasticiser may be employed, in which a screw operates within the cylinder to drive the plastics material towards the mould while simultaneously heating and working it.

Until recently it was not considered possible to treat thermosetting materials in this way, since the heat necessary to plasticise them would also initiate their cure. Consequently thermosetting materials have usually been moulded by compression moulding techniques in a vertical press between heated platens; techniques which were slow in comparison with the injection moulding of thermoplastics.

Some progress has been made in the faster moulding of thermosetting materials, however, including the development of improved processes involving, for example, careful heating of the material by high frequency or infrared heating before it enters the mould. This was not very successful and the more recent process of transfer moulding, using a screw plasticiser to heat the material prior to its introduction into the mould, was developed. The principle of this process is similar to that of the injection moulding of thermoplastics, but because of the nature of the material being treated particular attention has to be paid to the control of temperature and also the form of the screw.

It will be convenient for the purposes of this specification to refer to material that has been treated in the plasticiser as being "preplasticised."

Two main types of apparatus have been described for the injection moulding of thermosetting materials, one which has all the general features of a horizontal injection moulding machine for thermoplastics, that is having a horizontal mould lock and a horizontal screw unit; and a second in which the screw unit is horizontal and is arranged to force the preplasticised material into a vertical transfer pot or cylinder fitted beneath the lower mould surface of a vertical locking press. It is with the second type of apparatus that the present invention is especially, although not solely, concerned. With an apparatus such as this, the preplasticised material can be forced into the transfer pot in two ways: (i) by way of a port cut horizontally through the lower mould, or (ii) by raising the mould up on a special bolster and extending the transfer pot downwards until it shows beneath the mould. With method (ii) a port is cut into the wall of the pot and the nozzle of the screw unit is made to communicate with this port beneath the mould.

Both (i) and (ii) have their disadvantages; method (i) requires a special mould, and is thus rarely employed; method (ii) entails considerable loss of press daylight, and also requires a long transfer ram stroke to enable the piston within the transfer pot to be withdrawn below the port through which the preplasticised material enters.

The present invention provides apparatus for and a method of charging preplasticised material into a transfer pot of a moulding apparatus without the necessity for a special mould or the provision of a port in the transfer pot, and thus enables the advantages of preplasticising to be applied to existing apparatus without the modification of the moulds required by the techniques described.

According to the present invention a transfer moulding apparatus comprises two relatively separable mould parts, at least one of the mould parts having associated with it a transfer pot, and means adapted, when the mould parts are separated, to move between the mould parts and charge a predetermined amount of moulding material into the transfer pot.

The means adapted to move between the mould parts will usually be a screw preplasticiser and in one embodiment of the invention the screw preplasticiser is made horizontally reciprocable and the barrel thereof is provided with a right-angled end piece so that preplasticised material can be discharged from it in a direction substantially at right angles to the main axis of the preplasticiser. The end piece may be brought vertically over the transfer pot, when the mould is open, to discharge preplasticised material into the transfer pot, and moves back to its normal rest position when the mould halves begin to close.

This form of the apparatus may present a slight problem in that there may be a tendency for preplasticised material waiting in the right-angled discharge end piece to stiffen to the extent that it cannot be forced around the bend. This tends to happen particularly when moulding operations are suspended for any length of time, and it necessitates the stripping down and cleaning of the end piece. For continuous operation this may not present a problem but if it should be necessary a slight modification of the discharge end will overcome this disadvantage. For example, a horizontal preplasticiser can be arranged to feed preplasticised material into a vertically disposed bore, from one end of which the material is discharged into a suitable transfer pot. The other end of this vertical bore is closed by a suitable stopper which can be removed to enable cleaning of residue from the bore.

In another embodiment the discharge end of the barrel of the preplasticiser is provided with a vertical bore in association with the horizontal bore of the barrel, and a plunger is reciprocable within the vertical bore such that in one position of the plunger moulding material may pass from the horizontal bore of the barrel into the vertical bore of the discharge end and in another position of the plunger moulding material may not pass from the horizontal bore to the vertical bore.

In yet another embodiment the preplasticiser is stationary, and the apparatus is provided with a carrier, e.g. a cup, which may collect preplasticised material from the preplasticiser, move between the mould halves to deposit the material into the transfer pot, and then move back to collect a further discharge of material from the preplasticiser.

The invention is illustrated by the accompanying drawings, which shown an embodiment of the invention in which a screw preplasticiser is reciprocable between two vertically separable mould halves. In the drawings, FIGURE 1 is a part sectional elevation showing the position of the important parts of the apparatus at the moulding stage;

FIGURE 2, also a part sectional elevation, shows the mould halves separated and preplasticised material being discharged into the transfer pot;

Figure 1:
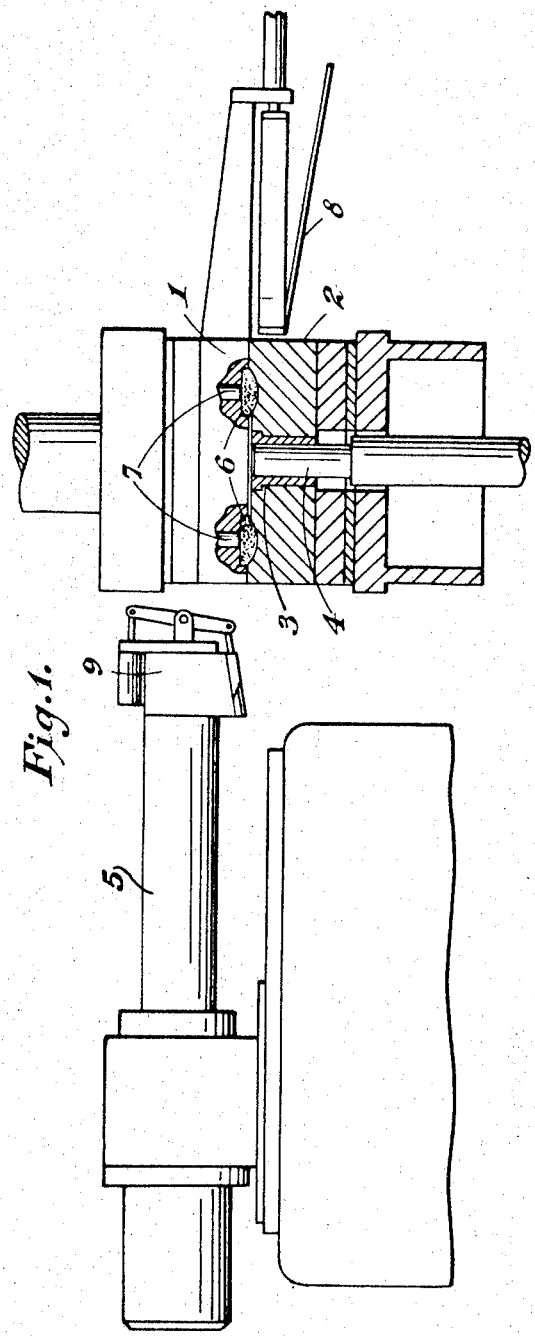

Referring to FIGURE 1, numerals 1 and 2 designate two co-operating mould halves, 1 being vertically reciprocable by means (not shown) which are conventional, and 2 being fixed. Associated with the lower mould half 2 is a transfer pot 3, within which is a vertically reciprocable piston or ram 4. The preplasticiser is shown generally as 5.

The mould parts are shown in FIGURE 1 as moulding two electrical parts 6 of, for instance, ¼″ thickness. When the pressing and curing of the parts 6 has been completed, the mould is opened, by raising mould half 1, and the parts are ejected by means of two plungers, 7, onto an inclined plate, 8, which has moved into position beneath mould half 1. The parts slide off plate 8 and are collected. In an alternative machine, the parts 6 could be removed from the lower mould half 2.

Figure 2:
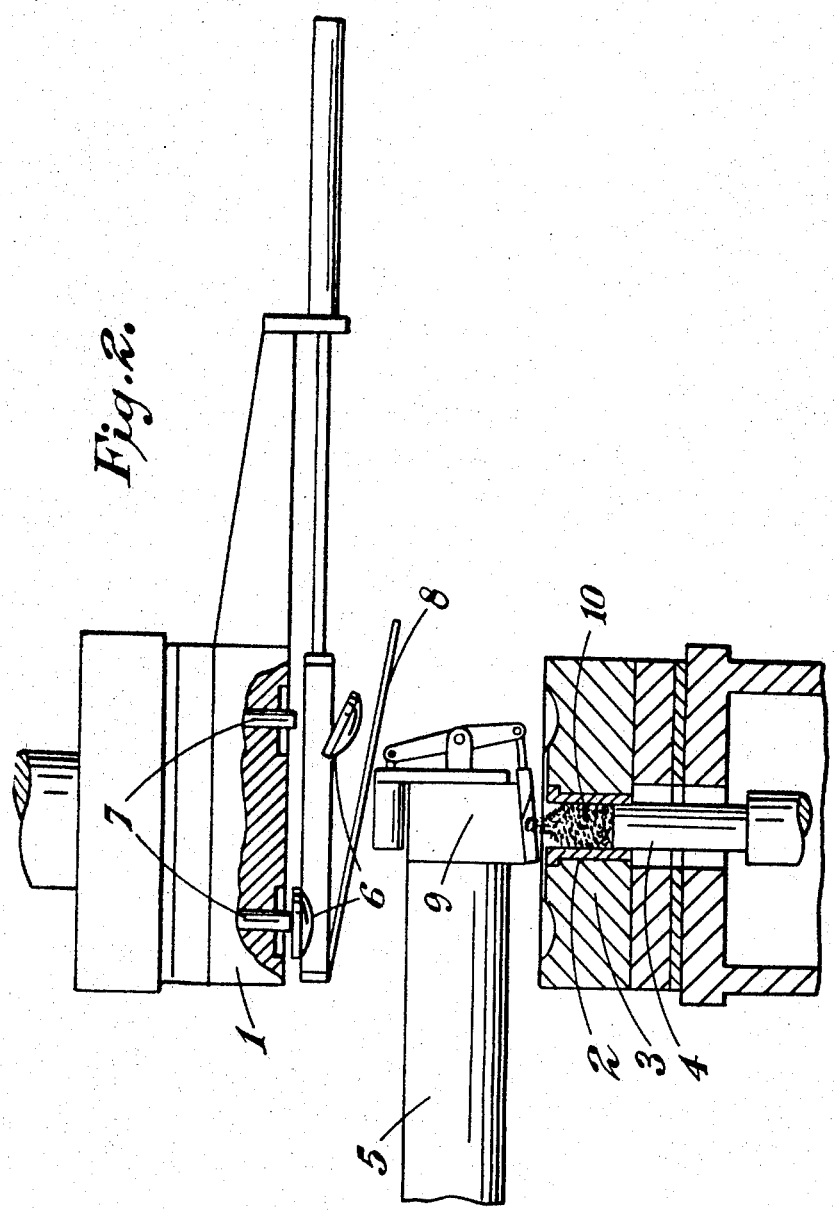

As mould half 1 is raised, the preplasticiser 5 moves to a position between the mould halves, as shown in FIGURE 2, and the piston 4 moves downwardly in the transfer pot 3. The discharge end 9 of the barrel of the preplasticiser comes to rest directly above the transfer pot, and discharges moulding material 10 into the pot. The preplasticiser 5 then moves back to the position in FIGURE 1, mould half 1 moves down to contact mould half 2, and the piston 4 moves upwardly under pressure to force the material in the pot 3 into the space defined by the mating faces of the mould halves.

Figure 3:
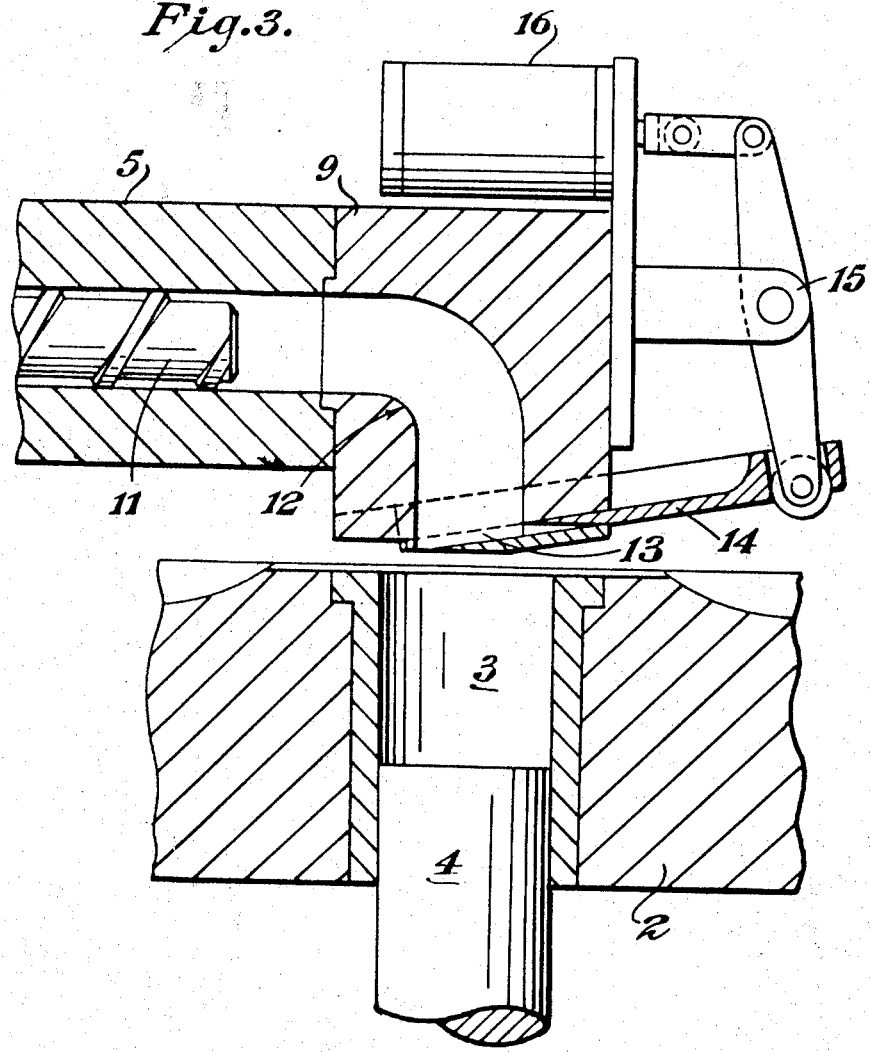
FIGURE 3 is a detailed sectional elevation, on a larger scale, of the discharge end of the barrel of one embodiment of the apparatus.

FIGURE 3 shows the discharge end 9 of the barrel of the preplasticiser 5 of FIGURES 1 and 2 in more detail The preplasticising screw 11 forces preplasticised material around the right-angled bend 12 and out of the orifice 13 into the transfer pot 3. Orifice 13 is opened and closed by means of the sliding plate or knife 14, which is operated by a linkage 15 connected to a pump 16. The orifice as shown in FIGURES 2 and 3 is open, in FIGURE 1 it is closed.

In the embodiment shown in FIGURE 3 a single sliding plate or knife 14 is used to shear off the extruded preplasticised material. In an alternative embodiment, two co-operating knives may be used to achieve a cleaner cut. It is also preferable for the knives to be inclined at a slight angle (e.g. 3°) to the horizontal. By this means, as the unit 5 withdraws, the material in the pot 3 is not dragged over the mould face.

Figure 4:
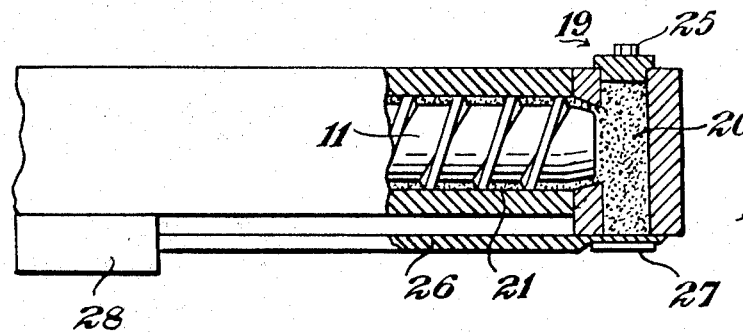
FIGURE 4 is a part sectional elevation of the discharge end of the preplasticiser modified by the provision of a vertical bore.
Figure 5:
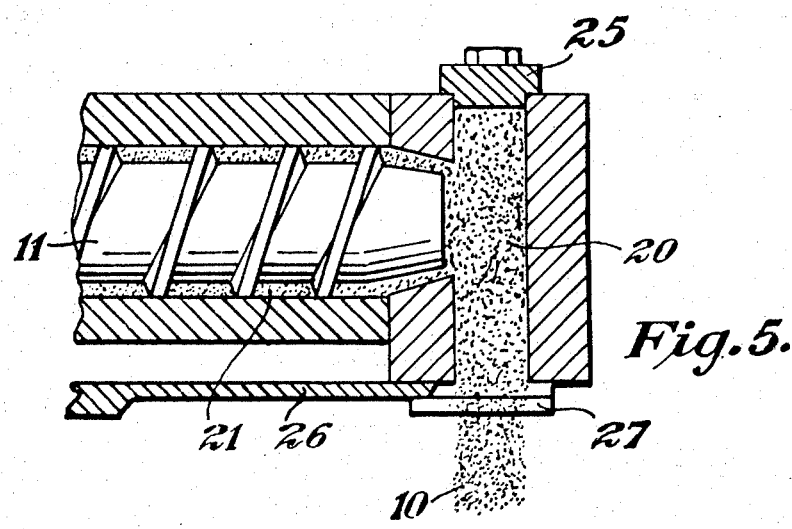
FIGURE 5 is a part sectional elevation of the apparatus of FIGURE 4 showing preplasticised material being discharged from the vertical bore.

FIGURES 4, 5, 6 and 7 illustrate modifications of the discharge end of the preplasticiser barrel. The discharge end of the barrel, designated generally 19, is provided with a vertical bore 20 into which preplasticised material 10 may be forced from the the horizontal bore 21 by means of the preplasticising screw 11. One end of the vertical bore in FIGURES 4 and 5 is closed by an easily removable stopper 25 (retained by bolts), so that the pressure of the screw tends to force the preplasticised material out of the other end of the vertical bore, as shown in FIGURE 5. In the apparatus shown in FIGURES 6 and 7 there is reciprocable within the bore 20 a plunger 22, the reciprocating movement of which is controlled by means of a jack 23 and a system of levers 24.

In the apparatus of FIGURES 4 and 5, passage of the preplasticised material from the vertical bore 20 into the transfer pot is controlled by a sliding knife 26, which slides in the knife guide 27. The knife is controlled by a jack 28. FIGURE 4 shows the knife in position closing the bore and in FIGURE 5 it is slid aside to allow passage of material into the transfer pot. An advantage of this embodiment over that shown in FIGURES 1–3 is that the extent to which the mould halves need to be separated to allow the preplasticiser to pass between them is not so great as when the pump controlling the knife is situated as shown in those figures. Furthermore, any solidified material remaining in the vertical bore can easily be removed by unbolting the stopper 25 and scraping out the material so exposed.

Figure 6:
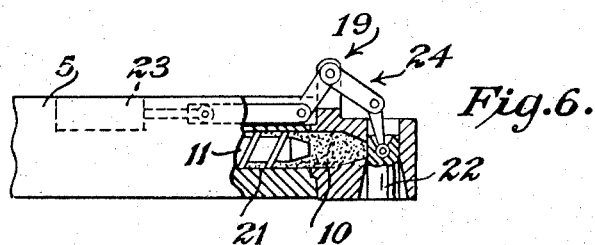
FIGURE 6 is a part sectional elevation of the discharge end of the preplasticiser modified by the provision of a vertical bore and an associated reciprocating plunger.
Figure 7:
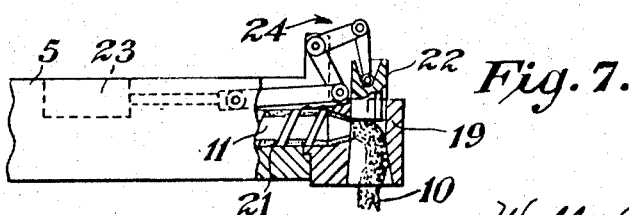
FIGURE 7 is a part sectional view of the same apparatus showing the discharge of material.

In the apparatus shown in FIGURE 6, plunger 22 is in its downward position, and when in this position it prevents the passage of moulding material from the bore 21 into the bore 20. In its upward position, that illustrated in FIGURE 7, it allows the moulding material to pass from the bore 21 into the bore 20, and from there into the transfer pot 3.

In operation, the preplasticising screw 11 rotates and pushes preplasticised material towards the horizontal space in front of the screw. This moves the screw back until the correct amount of material is metered, when the screw stops. During this operation, plunger 22 is in its FIGURE 6 position and moulding is taking place in the mould formed by the two mould halves.

When moulding in the mould has finished, the preplasticiser 5 moves to the discharge position, the discharge end of the barrel moving between the mould halves as in FIGURE 2 so that the vertical bore 20 is in alignment with the transfer pot 3. Plunger 22 is then moved to its upward position to allow preplasticised moulding material to be forced by screw 11 from bore 21 through bore 20 to transfer pot 3. Plunger 22 is then moved downwards to force all of the material in the bore 20 into the pot 3 and at the same time to shut off the passage of further moulding material into bore 20. The preplasticiser 5 is then withdrawn from between the mould halves to the position shown in FIGURE 1.

By suitable control of the screw 11 and the plunger 22 predetermined amounts of moulding material may be charged into the transfer pot. As described above the plunger is operated only when the discharge end 19 of of the barrel is directly above the transfer pot 3. The plunger could of course, depending on circumstance, be moved into its upper position before or during movement of the preplasticiser 5 to its position between the mould halves.

One advantage of this embodiment is that it ensures that all the material entering the bore 20 is forced into the transfer pot 3, leaving bore 20 empty for the next operating cycle. Also, any material remaining in the horizontal bore which becomes hard and unsuitable for moulding, and which must therefore be removed, may by repeated operation of the plunger 22 and the screw 11 be forced into the bore 20 and "chopped off"; such an operation will be continued until material in the required condition for moulding appears from the bore 20.

As illustrated, particularly when using a reciprocating plunger in the vertical bore the bore may be tapered to a larger diameter at its lower end, the taper starting from just below the point where moulding material enters the bore. Although such a taper is not essential, we have found that it eases the downward movement of the plunger.

What is claimed is:

1. A transfer moulding appaartus comprising two relatively vertically separable mould parts defining a moulding cavity, at least one of the mould parts having associated with it a transfer pot, first means adapted successively to separate and bring together the mould parts, a screw preplasticizer having a barrel with a first bore extending there along, said preplasticizer being adapted to reciprocate horizontally between the mould part when the mould parts are separated to convey moulding material between the mould parts, to discharge the material into the transfer pot, and to retract from between the mould parts, said barrel being provided at its discharge end with a second bore in right angle association with said first bore of said barrel, one end of said second bore being closed and the other end having an outlet for discharging moulding material, and second means adapted to transfer the moulding material from said transfer pot to said moulding cavity when said mould parts are brought together.

2. An apparatus according to claim 1 wherein discharge of moulding material from the outlet is controlled by a knife which is slidably reciprocable across the outlet.

References Cited

UNITED STATES PATENTS

| | | |
|---|---|---|
| 2,402,462 | 6/1946 | Sullivan. |
| 2,490,625 | 12/1949 | Hall. |
| 2,996,756 | 8/1961 | Korsch et al. |
| 3,196,485 | 7/1965 | Battenfeld et al. |
| 3,360,827 | 1/1968 | Aichele. |

FOREIGN PATENTS

| | | |
|---|---|---|
| 609,012 | 9/1960 | Italy. |

WILBUR L. McBAY, *Primary Examiner.*